United States Patent
Sekharan

(10) Patent No.: US 9,389,777 B2
(45) Date of Patent: Jul. 12, 2016

(54) GESTURES FOR MANIPULATING TABLES, CHARTS, AND GRAPHS

(71) Applicant: Satishkumar Sekharan, Vancouver (CA)

(72) Inventor: Satishkumar Sekharan, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 179 days.

(21) Appl. No.: 14/075,636

(22) Filed: Nov. 8, 2013

(65) Prior Publication Data

US 2015/0135113 A1    May 14, 2015

(51) Int. Cl.
| | | |
|---|---|---|
| G06F 3/00 | (2006.01) | |
| G06F 3/048 | (2013.01) | |
| G06F 3/0488 | (2013.01) | |
| G06F 3/0481 | (2013.01) | |
| G06F 3/0484 | (2013.01) | |
| G06F 3/0482 | (2013.01) | |
| G06F 3/033 | (2013.01) | |

(52) U.S. Cl.
CPC ............ *G06F 3/0488* (2013.01); *G06F 3/0482* (2013.01); *G06F 3/04817* (2013.01); *G06F 3/04842* (2013.01); *G06F 3/04845* (2013.01)

(58) Field of Classification Search
None
See application file for complete search history.

(56) References Cited

U.S. PATENT DOCUMENTS

| | | | | |
|---|---|---|---|---|
| 7,242,403 | B2 * | 7/2007 | Phelan ................... | G06T 11/206 345/440 |
| 8,527,909 | B1 * | 9/2013 | Mullany ................ | G06F 3/0484 345/173 |
| 2011/0115814 | A1 * | 5/2011 | Heimendinger et al. ...... | 345/619 |
| 2011/0163968 | A1 * | 7/2011 | Hogan ........................... | 345/173 |
| 2012/0229468 | A1 * | 9/2012 | Lee ........................ | G06F 9/4443 345/440 |
| 2012/0254783 | A1 * | 10/2012 | Pourshahid .......... | G06F 3/04883 715/771 |
| 2013/0271493 | A1 * | 10/2013 | Shiroor .................... | G09G 5/00 345/635 |
| 2013/0275904 | A1 * | 10/2013 | Bhaskaran et al. ........... | 715/771 |
| 2013/0275905 | A1 * | 10/2013 | Bhaskaran et al. ........... | 715/771 |
| 2013/0293480 | A1 * | 11/2013 | Kritt et al. ...................... | 345/173 |
| 2013/0298085 | A1 * | 11/2013 | Kritt ...................... | G06F 3/0488 715/863 |
| 2014/0062894 | A1 * | 3/2014 | Werner ......................... | 345/173 |
| 2014/0098020 | A1 * | 4/2014 | Koshi et al. ................... | 345/156 |
| 2014/0149947 | A1 * | 5/2014 | Blyumen ...................... | 715/863 |
| 2014/0282276 | A1 * | 9/2014 | Drucker et al. ............... | 715/863 |
| 2015/0135113 | A1 * | 5/2015 | Sekharan .............. | G06F 3/0488 715/771 |

* cited by examiner

*Primary Examiner* — Yongjia Pan
(74) *Attorney, Agent, or Firm* — Fountainhead Law Group PC

(57) ABSTRACT

Gestures are described for manipulating tables, charts and graphs. For tables, a swipe gesture is described that deletes a column from a table when the gesture is detected on a column of the table. A pinch gesture is also described that combines two or more columns or rows of a table when the gesture is detected on columns of the table. For charts and graphs, a swipe gesture is described that changes the contents of the chart or graph when the gesture is detected on an axis label of the chart or graph. Another swipe gesture is describes that modifies the appearance of the chart or graph when the gesture is detected on or near an edge of the chart or graph and moving towards the center of the chart or graph.

13 Claims, 18 Drawing Sheets

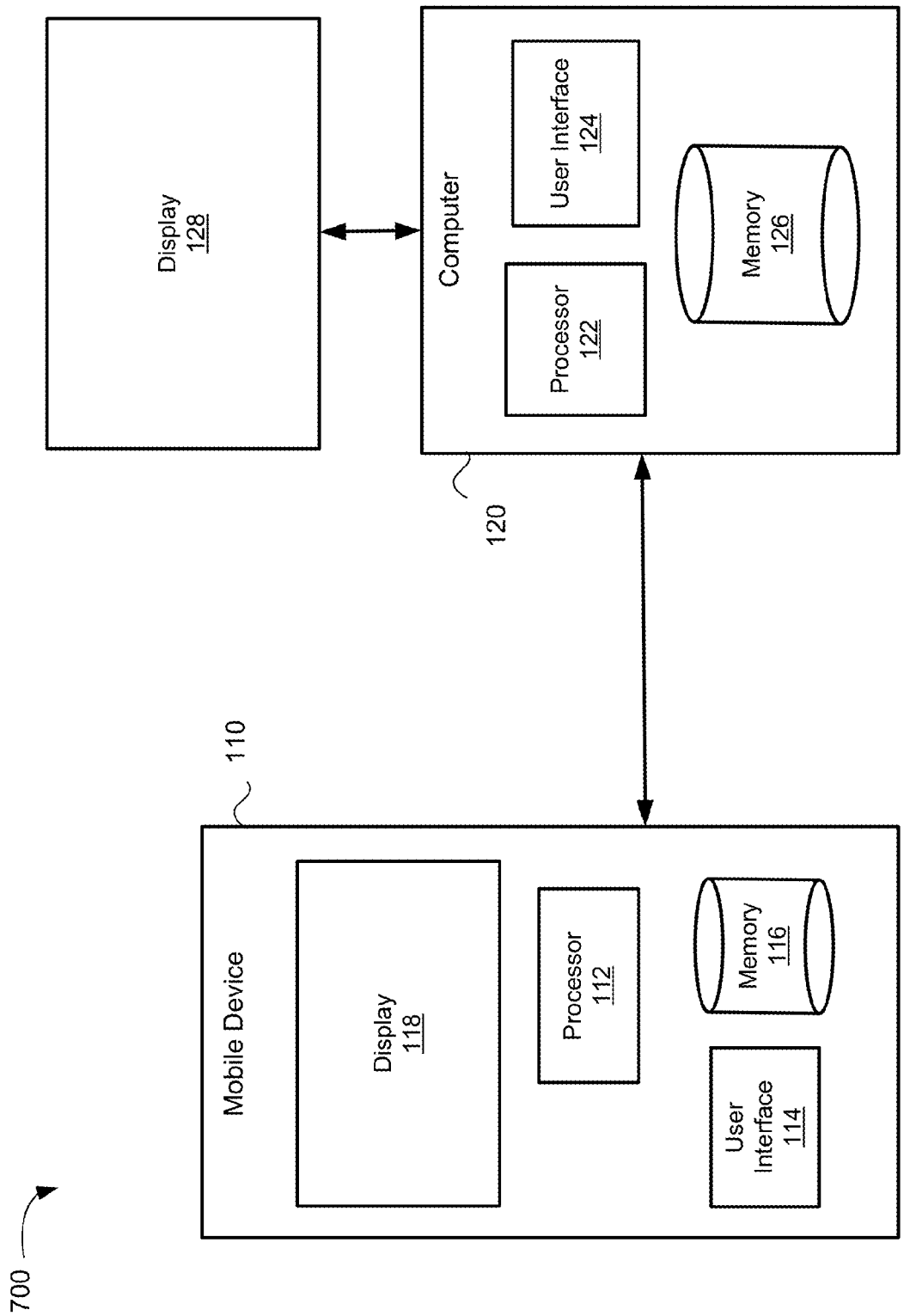

| | A | B | C | D |
|---|---|---|---|---|
| 1 | City | Providence | Population | Average_Percentage |
| 2 | Surrey | BC | 444583 | 58.2 |
| 3 | New Westminster | BC | 66311 | 43.4 |
| 4 | Vancouver | BC | 660496 | 33.5 |
| 5 | Langley | BC | 105708 | 30.5 |
| 6 | Maple Ridge | BC | 77202 | 24.5 |
| 7 | Burnaby | BC | 230009 | 20.7 |
| 8 | North Vancouver | BC | 51175 | 10.7 |
| 9 | Richmond | BC | | 0.7 |
| 10 | Port Coquitlam | BC | | -10.9 |
| 11 | Coquitlam | BC | | -11.8 |
| 12 | Delta | BC | | -18.7 |
| 13 | West Vancouver | BC | 50269 | -38.3 |

Do you want to delete column Population?

Cancel     Ok

GESTURES FOR MANIPULATING TABLES, CHARTS, AND GRAPHS

BACKGROUND

Mobile devices such as tablets and smart phones are becoming increasingly powerful. Network infrastructures have also improved to support rapid transmission of data between servers, computers, and mobile devices. Due to improvements in network connectivity and performance, mobile devices can now perform tasks that previously could only be performed on a desktop computer. This can provide a user the flexibility to begin a task on a computer, seamlessly transition to the mobile device while performing the task, and complete the task on the mobile device.

A user interacts with a desktop computer and a mobile device through one or more displays. Due to differences in the size of the display on the mobile device versus the desktop computer, the graphical user interface (GUI) of the mobile device can more complex than the counterpart on the desktop computer. As a result, performing an action on the mobile device can require navigating through additional menus and submenus or a more complex process flow. This additional complexity can be undesirable to the user.

SUMMARY

In one embodiment, a computer-implemented method presents, by a processor, a chart that is based on a dataset, the chart being configured to graphically present data associated with at least one variable of the dataset. The method then presents, by the processor, a flippable element being configured to display the name of a variable that is graphically presented in the chart when in an unflipped state and to display the name of another variable of the dataset that is not graphically presented in the chart when in a flipped state. The method then continues with detecting, by the processor, a user input to set the flippable element to another variable of the dataset. Upon receiving the user input, the method then updates, by the processor, the chart to graphically present data associated with the another variable of the dataset.

In another embodiment, a non-transitory computer readable storage medium stores one or more programs comprising instructions for presenting a chart that is based on a dataset, the chart being configured to graphically present data associated with at least one variable of the dataset. The one or more programs further include instructions for presenting a flippable element being configured to display the name of a variable that is graphically presented in the chart when in an unflipped state and to display the name of another variable of the dataset that is not graphically presented in the chart when in a flipped state. The one or more programs further include instructions for detecting a user input to set the flippable element to another variable of the dataset. The one or more programs further include instructions for updating the chart to graphically present data associated with the another variable of the dataset.

In another embodiment, a computer implemented system comprises one or more computer processors and a non-transitory computer-readable storage medium. The non-transitory computer-readable storage medium comprises instructions, that when executed, control the one or more computer processors to be configured for presenting a chart that is based on a dataset, the chart being configured to graphically present data associated with at least one variable of the dataset, presenting a flippable element being configured to display the name of a variable that is graphically presented in the chart when in an unflipped state and to display the name of another variable of the dataset that is not graphically presented in the chart when in a flipped state, detecting a user input to set the flippable element to another variable of the dataset and upon receiving the user input, updating the chart to graphically present data associated with the another variable of the dataset.

The following detailed description and accompanying drawings provide a better understanding of the nature and advantages of the present disclosure.

BRIEF DESCRIPTION OF THE DRAWINGS

FIG. 1 illustrates a system according to one embodiment;
FIGS. 3a to 3c illustrate a swipe gesture to delete data in a dataset according to one embodiment.

DETAILED DESCRIPTION

Figure 2A:
FIGS. 2a and 2b illustrate a hidden toolbar according to one embodiment.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

FIG. 1 illustrates a system according to one embodiment. System 100 includes two computing devices, mobile device 110 and desktop computer 120. Mobile device 110 includes processor 112, user interface 114, and memory 116, display 118. Processor 112 can be configured to execute a program stored in memory 116. Execution of the program can be to manipulate data stored in memory 116. The data stored in memory 116 can be presented to the user on display 118. In some examples, display 118 and user interface 114 can be combined in a touch screen interface.

Desktop computer 120 includes processor 122, user interface 124, and memory 126. Processor 122 can be configured to execute a program stored in memory 126. Execution of the program can be to manipulate data stored in memory 126. In some examples, the program stored in memory 116 and memory 126 can be two versions of the same program, where one is created for mobile device 110 and the other is created for desktop computer 120. In a similar fashion, data stored in memory 116 can be the same or similar to data stored in memory 126. In some examples, data stored in memory 116 can be a subset of the data stored in memory 126.

Computer 120 is coupled to display 128. A program from memory 126 that is executed by processor 122 can be output to display 128. Display 128 can be larger in size or have a higher resolution than display 118 and as a result, display 128 can present more information than display 118. In some embodiments, the graphical user interface (GUI) of mobile device 110 can be optimized to account for the display differences between display 118 of mobile device 110 and display 128. These optimizations can be stored as computer code in memory 116, executed by processor 112, and presented to the user on display 118. Below are some different embodiments of optimizations that can be part of the GUI of mobile device 110 or computer 120. These embodiments can be combined to form different embodiments.

Hidden Toolbar

Figure 2B:
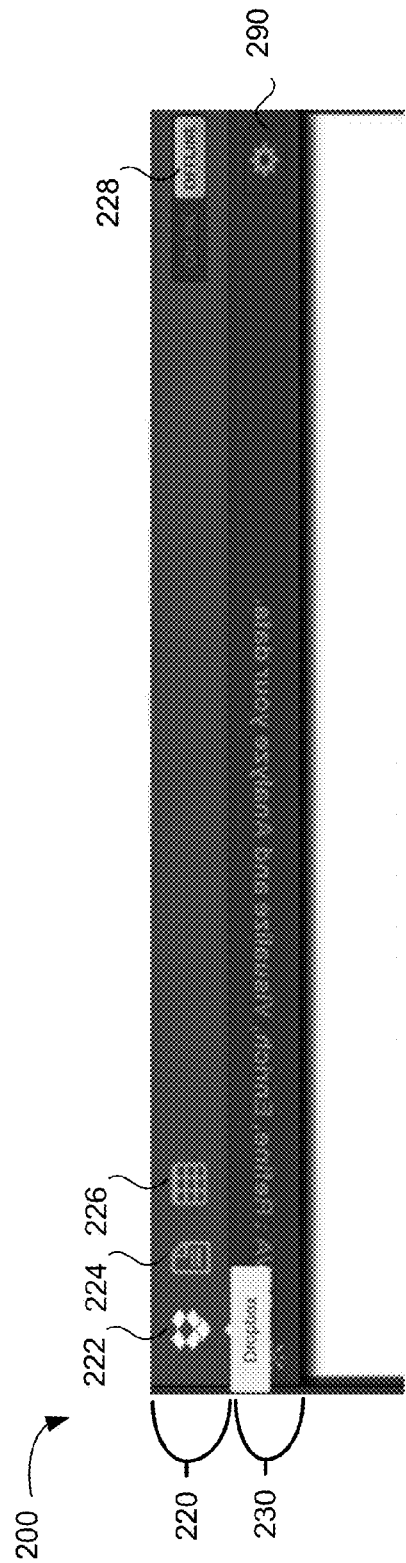

FIGS. 2a and 2b illustrate a hidden toolbar according to one embodiment. A toolbar can be hidden behind a logo or banner of an application. When the logo or banner is selected, the hidden toolbar is revealed. In one embodiment, the logo or banner can be flipped along an edge of the logo or banner to reveal the hidden toolbar. Once flipped, a mirror image of the logo or banner can be presented alongside the hidden toolbar. In another embodiment, the logo or banner can fade away or disappear to reveal the hidden toolbar. This can allow a portion of the display that has been allocated for the logo or banner to take on a dual purpose. Under normal operation, the portion is utilized to present the logo or banner of the application and the hidden toolbar remains in a hidden state. However when the logo or banner is selected, the portion is repurposed to present the hidden toolbar. The hidden toolbar then transitions to a visible state. The hidden toolbar can include one or more buttons that when selected, can trigger an instruction for the application. The one or more buttons can become active when the hidden toolbar is in the visible state. In one embodiment, one or more buttons that are a part of the logo or banner can become inactive yet visible when the hidden toolbar is in the visible state. In one example, selection of the logo or banner can be through a tap gesture. In another example, the selection of the logo or banner can be through a mouse click.

FIG. 2a illustrates a hidden toolbar in a hidden state according to one embodiment. The hidden toolbar is part of an application called REVA. As shown, display 200 includes banner 210. Banner 210 includes a settings button 290 that when selected, allows settings of the application to be changed. The hidden toolbar is in a hidden state and thus is not presented on display 200.

FIG. 2b illustrates a hidden toolbar in a visible state according to one embodiment. The hidden toolbar can transition to the visible state when banner 210 of FIG. 2a has been selected. When selected, an animation is presented where banner 210 is flipped along its bottom edge to transform banner 210 into mirrored banner 230. In one embodiment, mirrored banner 230 can be the reflective image of banner 210 if banner 210 were reflected by the bottom edge of banner 210. Mirrored banner 230 can be presented but not selectable. In some examples, the color, shading, or size of mirrored banner 230 can be modified to help illustrate that the mirrored banner 230 is inactive and thus cannot be selected. For example, mirrored banner 230 includes settings button 290 like banner 210. However, settings button 290 is in an inactive state and thus cannot be selected as it appears in mirrored banner 230. When banner 210 is flipped across its bottom edge to transform into mirrored banner 230, hidden toolbar 220 is revealed in a visible state. Hidden toolbar 220 includes icons 222, 224, and 226. Each icon can be configured to provide an instruction to import data from a source. When icon 222 is selected, a description of the icon is displayed. Here, the text "Dropbox" is displayed to notify the user that selection of this icon will import data from the user's Dropbox account. Hidden toolbar 220 further includes online tab 228. Selection of online tab 228 can sync the data in the REVA application with an online server to make the data available to other devices connected with the online server. By keeping hidden toolbar 220 hidden until selected, hidden toolbar 220 and banner 210 can occupy the same area of display 200. This can optimize the use of real estate on display 200.

Swipe to Delete

Figure 3A:
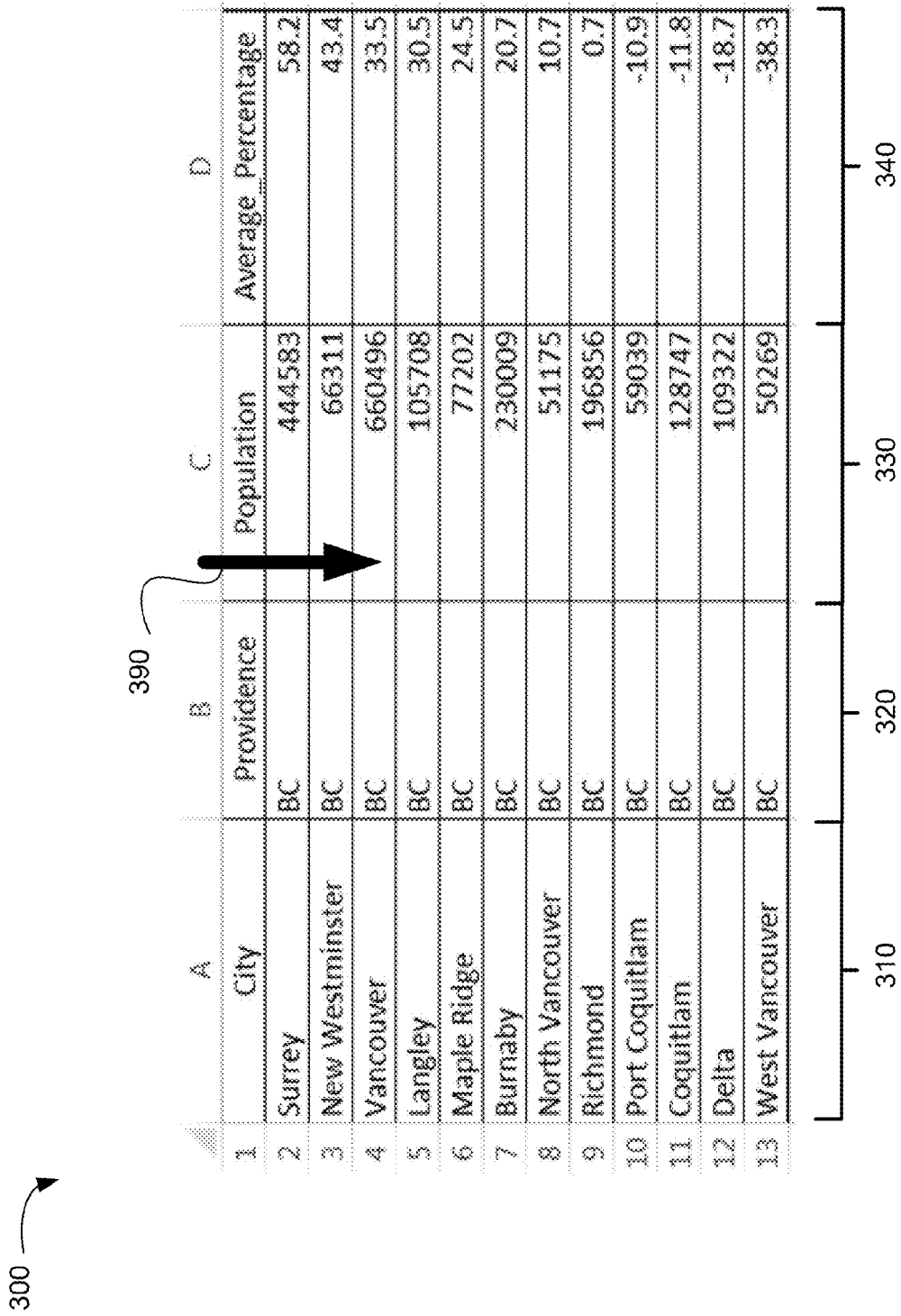
Figure 3C:
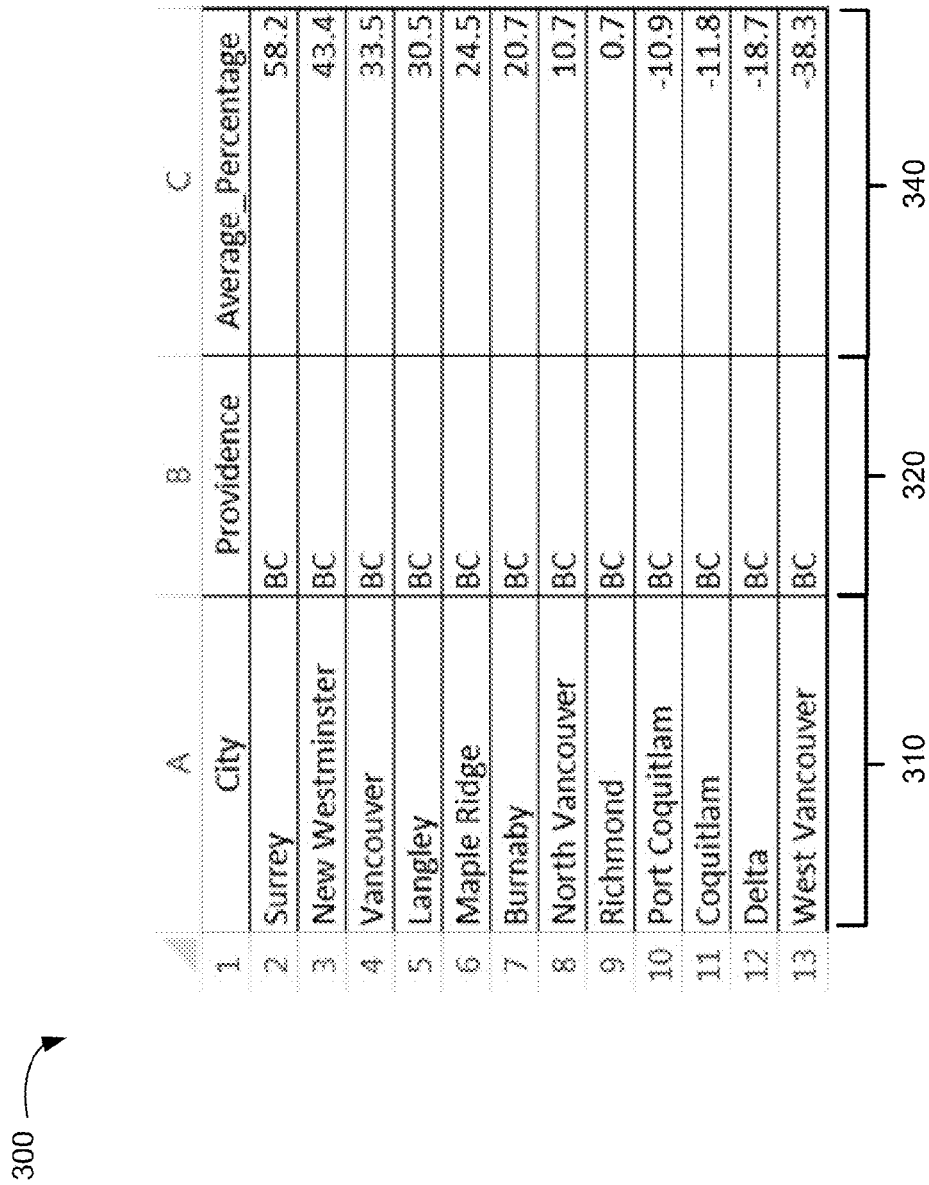

FIGS. 3a to 3c illustrate a swipe gesture to delete data in a dataset according to one embodiment. In one example, the dataset is a table. A swipe gesture can be a simple gesture to delete data from a dataset. Traditional techniques require the selection of one or more pieces of data and then subsequently instructing the application to delete the selected data. Often times, the instruction requires navigating through menus and submenus. In one embodiment, a column of data in a dataset can be deleted when a swipe gesture is received. In one example, the swipe gesture can originate from a column header and cross a predefined number of column entries in a downwards swipe. In another example, the swipe gesture can originate from a last entry in a column and cross a predefined number of column entries in an upwards swipe. In yet another example, the swipe gesture can originate from any entry in the dataset and cross a predefined number of entries that belong in the same column.

In another embodiment, a swipe gesture can delete a row of data from the dataset. For example, the swipe gesture can originate from an entry in the first column and cross a predefined number of row entries in a swipe to the right. As another example, a swipe gesture originating from an entry in the last column and cross a predefined number of row entries in a swipe to the left. As yet another example, a swipe gesture originating from any entry in the dataset and cross a predefined number of entries that belong in the same row. In some embodiments, the swipe gesture can be received by clicking and dragging with the use of peripheral device such as a mouse or pen. In other embodiments, the swipe gesture can be received by touching and swiping on a touch sensitive display. The swipe feature can be a simple way to delete a column or row of data from a dataset without having to navigate through menus or submenus which can be difficult on the smaller displays that are part of a mobile device such as a tablet.

FIG. 3a illustrates a swipe gesture deleting a column in a dataset according to one embodiment. Table 300 is presented on display 200 and includes columns 310, 320, 330, and 340. Each column includes data associated with a field. For example, column 310 stores data belonging to a city field, column 320 stores data belonging to a providence field, column 330 stores data belonging to a population field, and column 340 stores data belonging to an average percentage field. Each row can make up a record in table 300. When swipe gesture 390 is received during the presentation of table 300, the application can interpret swipe gesture 390 as an instruction to delete column 330. In one example, swipe gesture 390 can be initiated on or near the header of column 330 and cross a predefined number of column entries. Here, the predefined number of column entries is two. In other embodiments, the predefined number of column entries can vary.

FIG. 3b illustrates a confirmation window to delete a column in a dataset according to one embodiment. Confirmation window 350 is presented to the user after swipe gesture 390 has been received on table 300. Confirmation window 350 is configured to confirm whether the user would like to delete a column in table 300. Here, confirmation window 350 is presented in a pop up window that overlays table 300 and recites "Do you want to delete column Population?" Confirmation window 350 includes two selectable buttons to cancel or accept the deletion of the column. Confirmation window 350 is shown in the middle of table 300 in this embodiment. In another embodiment, confirmation window 350 can be presented at other locations on table 300. In some embodiments, the swipe gesture can delete the column without requiring confirmation from confirmation window 350.

FIG. 3c illustrates an updated dataset according to one embodiment. Table 300 has been updated after deletion of column 330. As shown, table 300 now consists of columns 310, 320, and 340.

Pinch to Combine

Figure 4A:
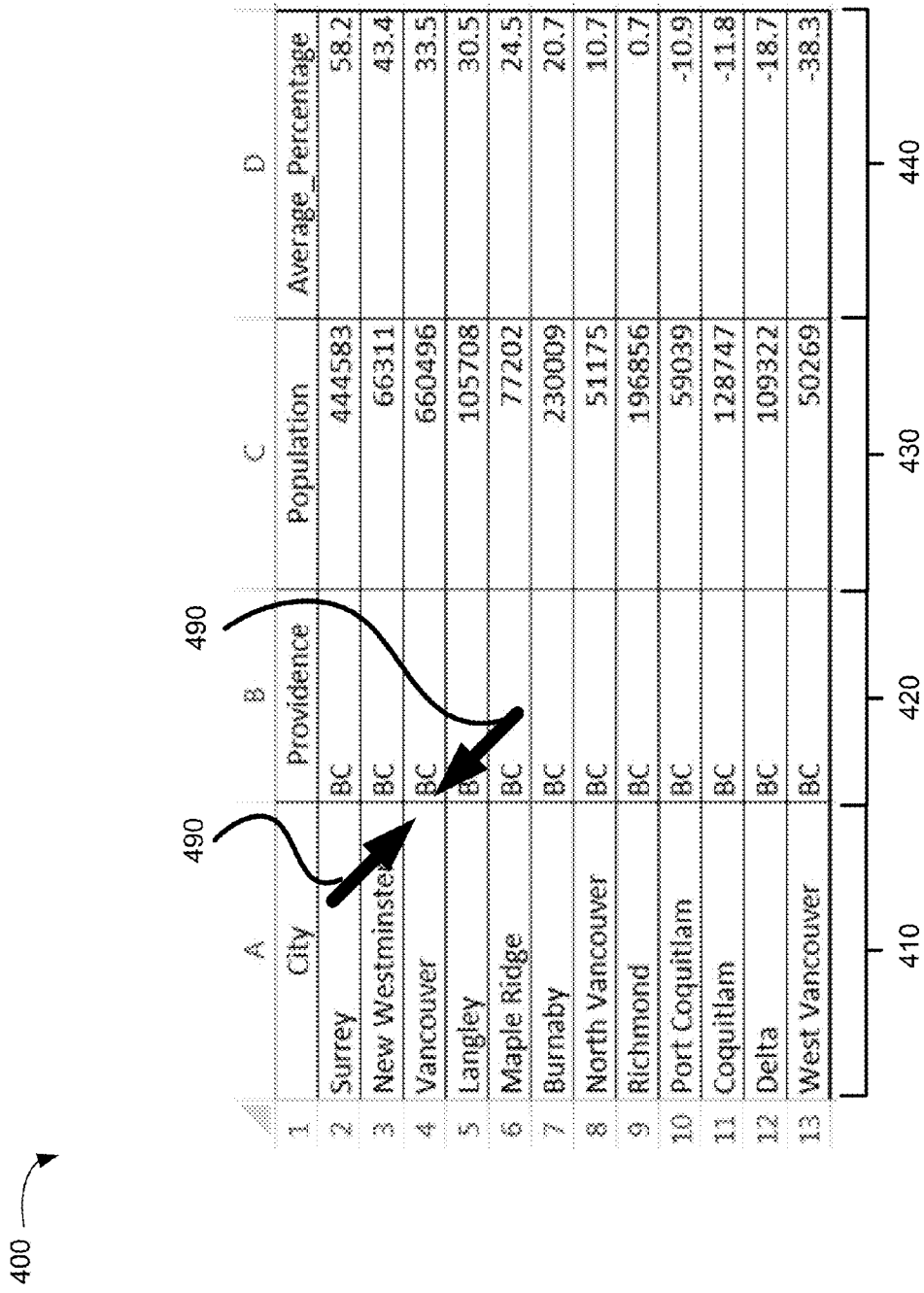
FIGS. 4a to 4c illustrate a pinch gesture to combine columns in a dataset according to one embodiment.
Figure 4B:
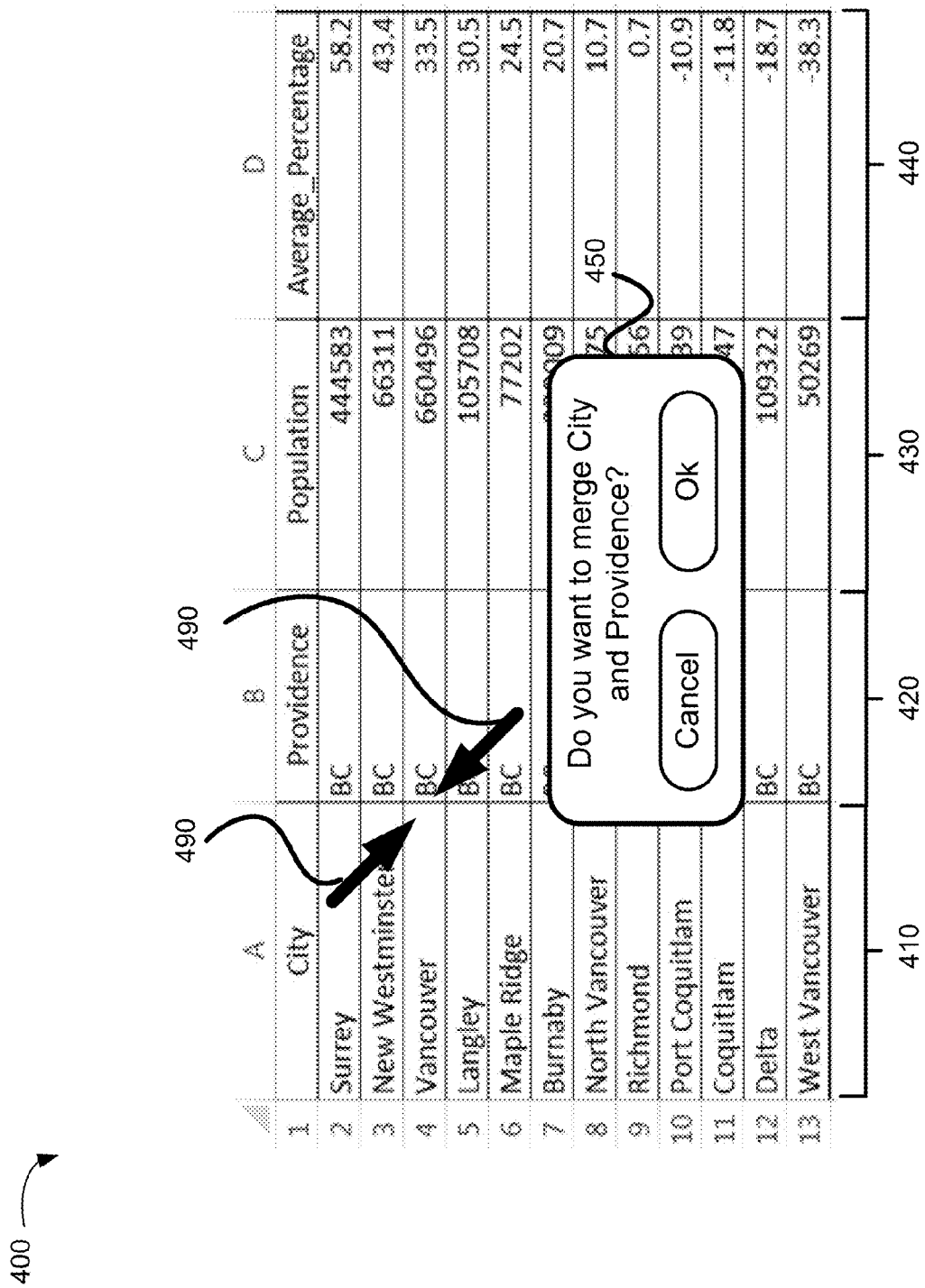
Figure 4C:
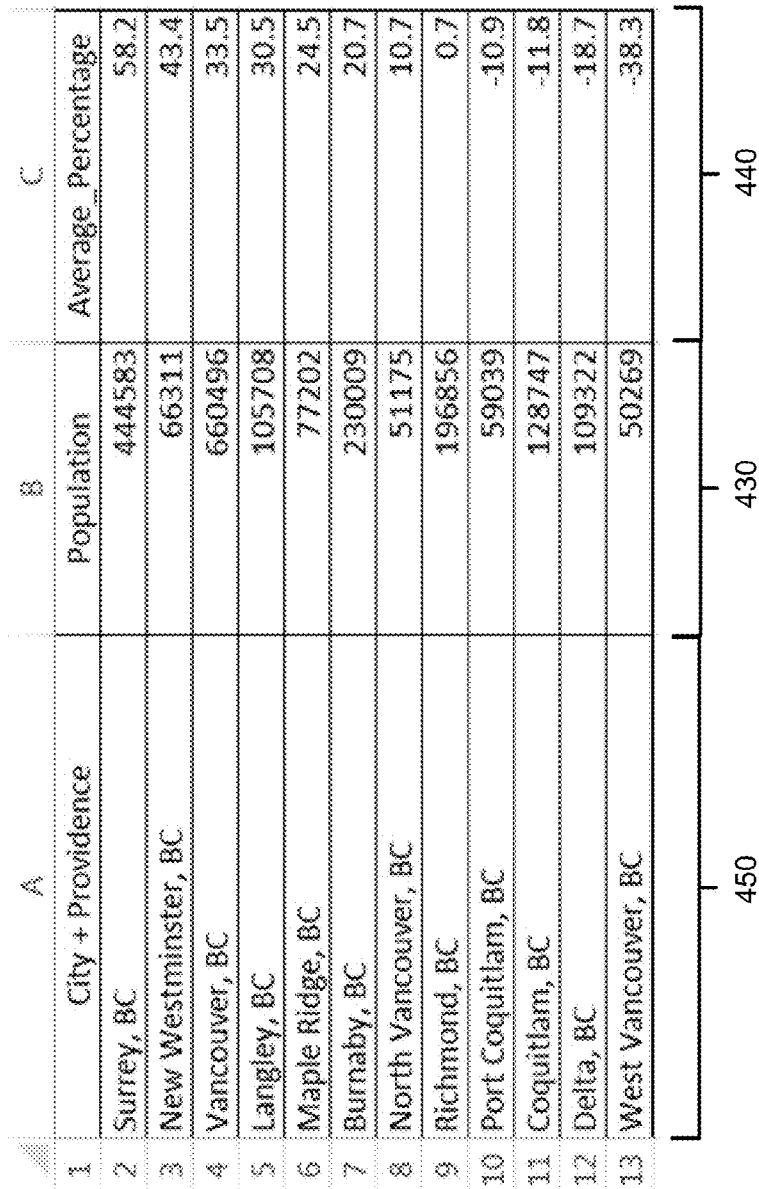

FIGS. 4a to 4c illustrate a pinch gesture to combine columns in a dataset according to one embodiment. A pinch gesture is a simple gesture that is performed on a touch interface display 200 to combine columns of a dataset. A pinch gesture can be a two finger touch on the touch screen display followed by decreasing the distance between the two fingers. Columns that are within the two fingers can be combined into a single column. In one example, the two fingers are initially touching neighboring columns and the two columns are be combined in response to the pinch gesture. As another example, the two fingers are initially touching two columns with an intermediate column in between. The three columns can be combined in response to the pinch gesture.

FIG. 4a illustrates a pinch gesture to combine two columns in a dataset according to one embodiment. Table 400 can be presented on display 200 and can include columns 410, 420, 430, and 440. An application presenting table 400 can receive an instruction to combine two columns of table 400 when pinch gesture 490 is performed on the touch display. In one embodiment, pinch gesture 490 can be triggered from sensing a combination of two touch gestures. A first touch gesture is initiated by sensing a first finger touching a first area of table 400. The first area can belong to or be associated with a first column of table 400. A second touch gesture is initiated by sensing a second finger touching a second area of table 400. The second area can belong to or be associated with a second column of table 400. After initiation of the first and second touch gesture, pinch gesture 490 is triggered when it is sensed that the first and second touch gesture move towards one another. For example, the pinch gesture can be triggered when the first touch gesture moves towards the second area after touching the first area while the second touch gesture can moves towards the first area after touching the second area. Here, pinch gesture 490 includes a first touch gesture that is initiated by touching column 410 and a second touch gesture that is initiated by touching column 420. The first touch gesture then moves in the direction of column 420 while the second touch gesture moves in the direction of column 410. Pinch gesture 490 can be interpreted by the application as an instruction to combine column 410 with column 420.

FIG. 4b illustrates a confirmation window to combine two columns in a dataset according to one embodiment. Confirmation window 450 is presented to the user after pinch gesture 490 has been received. Confirmation window 450 is configured to confirm whether the user would like to combine two columns in table 400. Similar to confirmation window 350, confirmation window 450 is presented in a pop up window that overlays table 400. Confirmation window 450 recites "Do you want to merge City and Providence?" along with two selectable buttons to cancel or accept the combination. Confirmation window 450 is shown in the middle of table 400 in this embodiment. In another embodiment, confirmation window 450 can be presented at other locations on the table. In some embodiments, the swipe gesture can delete the column without requiring confirmation from confirmation window 450.

FIG. 4c illustrates an updated according to one embodiment. Table 400 has been updated to include column that combines columns 410 and 420 in FIG. 4a. Table 400 includes new column 450 along with columns 430 and 440. As shown, the header of column 450 is the combination of the headers from columns 410 and 420. The entries in column 450 is a combination of the entries in column 410 and 420 separated by a separator. In this embodiment the separator is a ",", however in other embodiments, the separator can be a space, "+", "−", "&", and other character or symbol. The separator can be predefined by the application or defined by the user. In some embodiments, columns containing the same data type can be combined in a different manner than by using a separator. In one embodiment, columns that contain numbers can be combined by performing an arithmetic operation on the two numbers. For example, two columns that contain numbers can be combined by adding the two numbers together.

Dynamic Charts

FIGS. 5a to 5i illustrate a GUI presenting a dynamic chart according to one embodiment. The dynamic chart can be a graphical representation of a dataset. In some examples, the dataset has been modified by using the swipe to delete or pinch to combine gestures described above. The dynamic chart can present the dataset in a manner that is easier to visualize or process. In some embodiments, the GUI can be configured to detect gestures for dynamically updating the dynamic chart. The gestures can be touch gestures detected on a touch display. The gestures can also be received from a peripheral device such as a mouse.

Figure 5A:
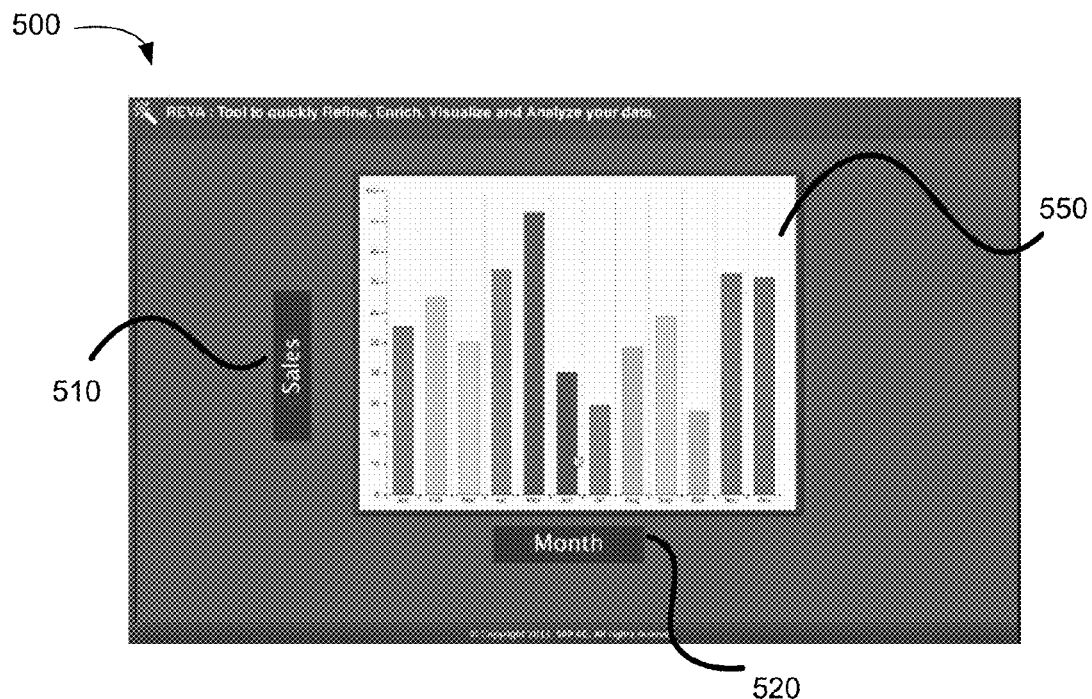
FIGS. 5a to 5i illustrate a GUI presenting a dynamic chart according to one embodiment.

FIG. 5a illustrates a GUI presenting a dynamic chart according to one embodiment. GUI 500 includes dynamic chart 550, y-axis label 510, and x-axis label 520. Dynamic chart 550 can by default display data from two variables of the underlying dataset. In other embodiments, more or fewer variables can be displayed on dynamic chart 550. Thus, some information from the underlying dataset is used to create dynamic chart 550 while other information from the underlying dataset is not used to create dynamic chart 550. The name of a first variable can be displayed on y-axis label 510 and the name of a second variable can be displayed on x-axis label 520. Thus, the names of the variables of data that are used to create dynamic chart 550 are presented on GUI 500. Y-axis label 510 and x-axis label 520 can be flippable elements that are configured to identify a variable that is being presented on the y-axis and x-axis of dynamic chart 550. When an instruction or gesture is detected to flip through a flippable element, a name or symbol associated with another variable of the underlying dataset can be presented. In one example, all variables from the underlying dataset that are not part of dynamic chart 550 can be flipped through by the flippable element. In one embodiment, the flippable element can display the name of a variable being graphically represented in dynamic chart 550 when in an unflipped state. In one embodiment, the two variables can be preselected depending on the chart type of dynamic chart 550. As an example, variables A and C are displayed by default when dynamic chart 550 is a histogram and variables A and B are displayed by default when dynamic chart 550 is a pie chart. Here, dynamic chart 550 is a histogram and thus, the first variable titled "Sales" and the second variable titled "Month" is displayed by default. In other embodiments, a particular chart type can be displayed by default depending on the variables selected. For example, a histogram can be displayed by default when the variables selected from the underlying dataset are "Sales" and "Month."

Figure 5B:
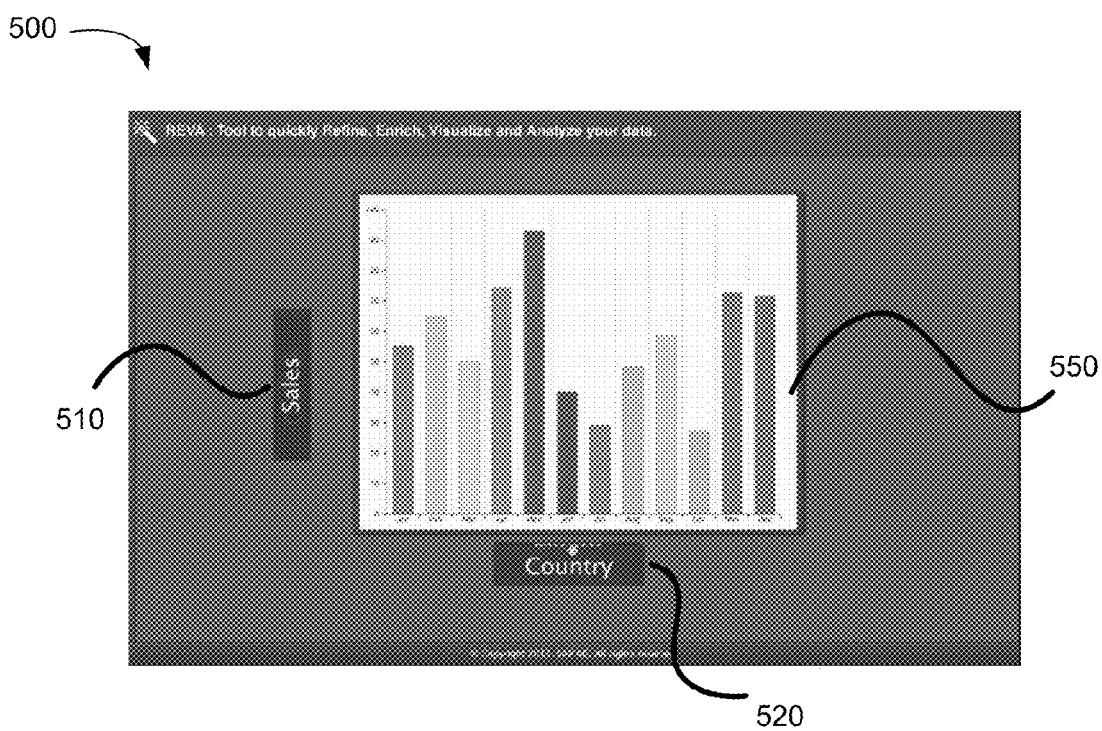

FIG. 5b illustrates a GUI presenting a dynamic chart according to one embodiment. Here, GUI 500 is presenting dynamic chart 550 from FIG. 5a. A gesture has been detected on the GUI on or near x-axis label 520. In one embodiment, the gesture can be a swipe gesture detected on or near x-axis label 520 being presented on a touch display. In another embodiment, the gesture can be a click and drag gesture detected on or near x-axis label 520 from a mouse. When the gesture is detected on or near x-axis label 520, the flippable element can transition to a flipped state. In the flipped state, an animation can be presented on the display. The animation can be x-axis label 520 rotating (i.e., flipping) to display the name of other variables in the underlying dataset that are not currently being represented by dynamic chart 550. Here, a hand icon is displayed on x-axis label 520 to signify that x-axis label 520 is selected and is being rotated by a detected gesture. The rotation of x-axis label 520 results in a change of the name from the "Month" variable to the "Country" variable. A change in the name displayed on x-axis label 520 can change the subset of data from the underlying dataset that is used to create dynamic chart 550. In one embodiment, the names of the variables displayed on x-axis label 520 and y-axis label 510 are the variables from the underlying dataset that are used to create dynamic chart 550. Therefore a change to one of the names displayed can result in the application updating dynamic chart 550. In one example, x-axis label 520 can rotate clockwise or counterclockwise depending on the direction of the drag gesture. This allows a user to scroll through the available variables in the dataset. In another example, x-axis label 520 the speed of rotation of x-axis label 520 can be directly proportional to the speed of the drag gesture.

Figure 5C:
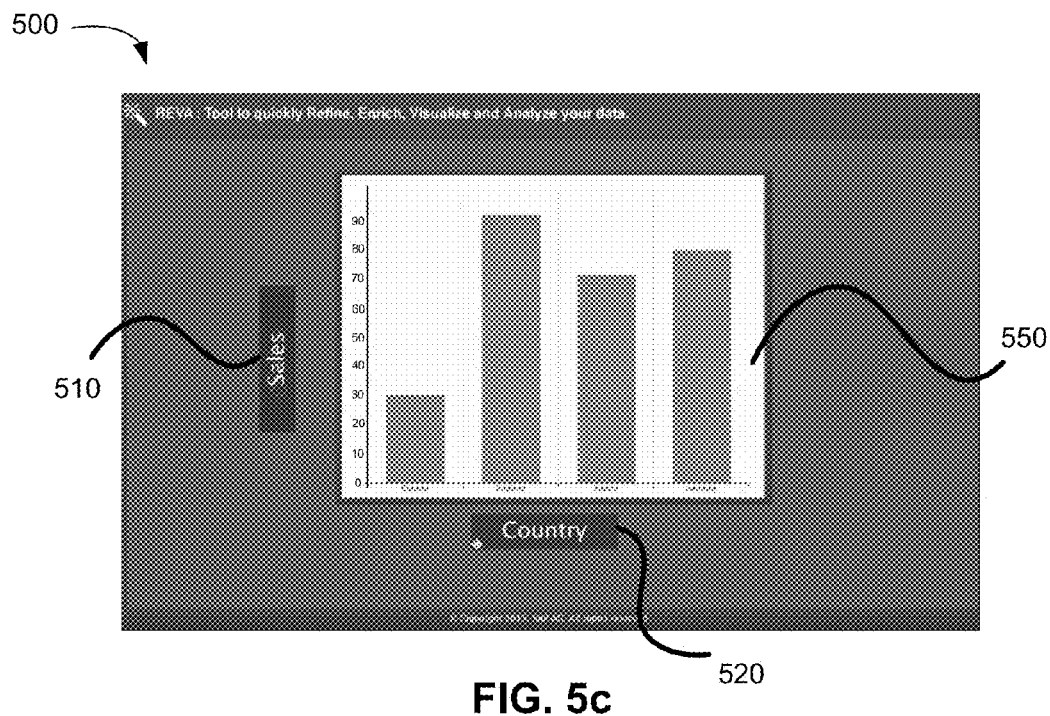

FIG. 5c illustrates a GUI presenting an updated dynamic chart according to one embodiment. Here, x-axis label 520 has been changed from the "Month" variable to the "Country" variable in response to a detected gesture in FIG. 5b. The application can dynamically update dynamic chart 550 in response to the change to x-axis label 520 to present an updated chart that is based on the data in the "Sales" variable and the data in the "Country" variable from the underlying dataset. This can include replacing the data associated with "Month" variable with data associated with the "Country" variable. The application can aggregate the data from the sales variable and the country variable of the underlying dataset to update dynamic chart 550. This can allow a user to compare different variables in the underlying dataset through a dynamic chart that can automatically update according to the variables selected through the use of gestures. As shown here, the scale for the x-axis of dynamic chart 550 can also be updated in response to the change in the x-axis label 520.

Figure 5D:
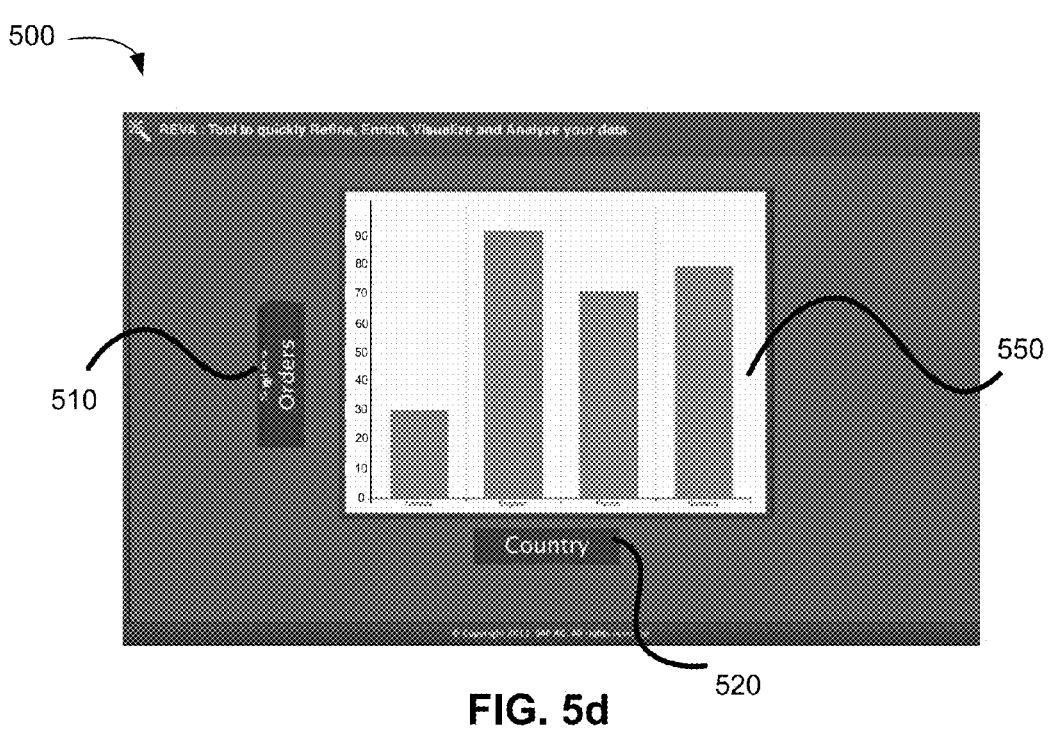

FIG. 5d illustrates a GUI presenting a dynamic chart according to one embodiment. GUI 500 has detected a gesture on or near y-axis label 510. The detected gesture can be a touch gesture or a click gesture as described above in FIG. 5b. When the application detects a horizontal sliding motion on or near x-axis label 510, x-axis label 510 can rotate to display in the direction of the sliding motion to reveal the name of other variables in the underlying table. Here, rotation of y axis label 510 has changed the text of y axis label 510 from "Sales" to "Orders."

Figure 5E:
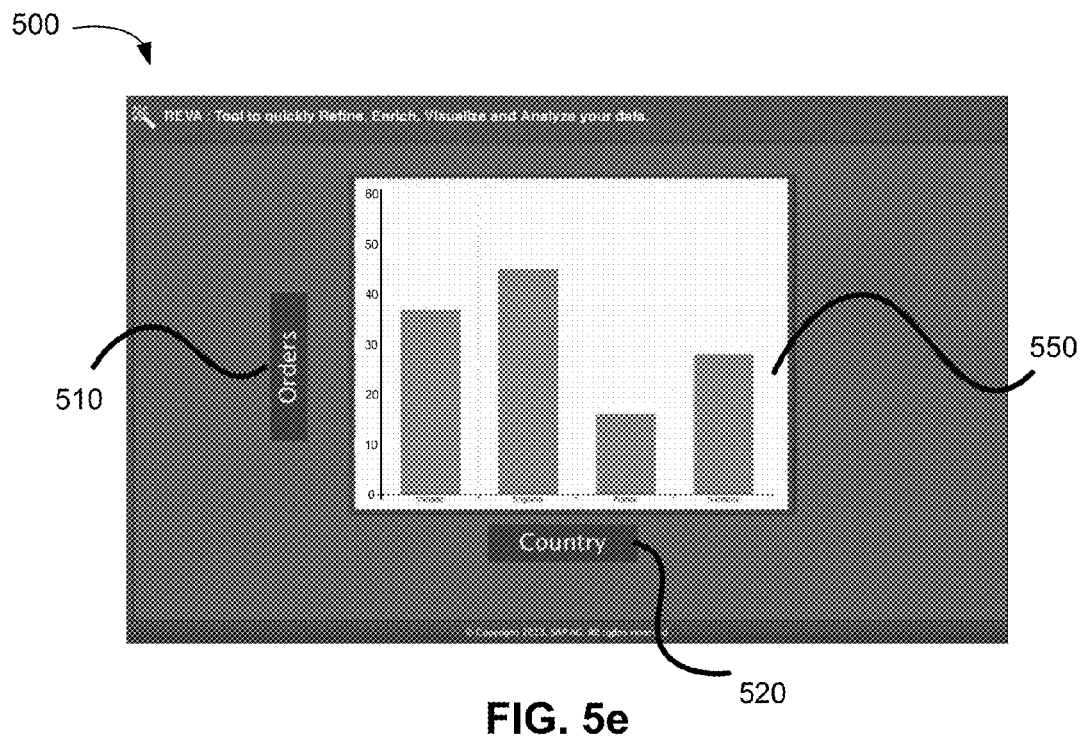

FIG. 5e illustrates a GUI presenting an updated dynamic chart according to one embodiment. GUI 500 presents dynamic chart 550 which has been dynamically updated from FIG. 5d. As shown, y-axis label 510 has been changed from the "Sales" variable to the "Orders" variable in response to a detected gesture. The application can dynamically update dynamic chart 550 in response to the change to y-axis label 510 to present an updated chart that is based on the data in the "Orders" variable and the data in the "Country" variable from the underlying table. The application can aggregate the data from the orders variable and the country variable of the underlying table to update dynamic chart 550. As shown here, the scale for the y-axis of dynamic chart 550 can also be updated in response to the change in the y-axis label 510.

Figure 5F:
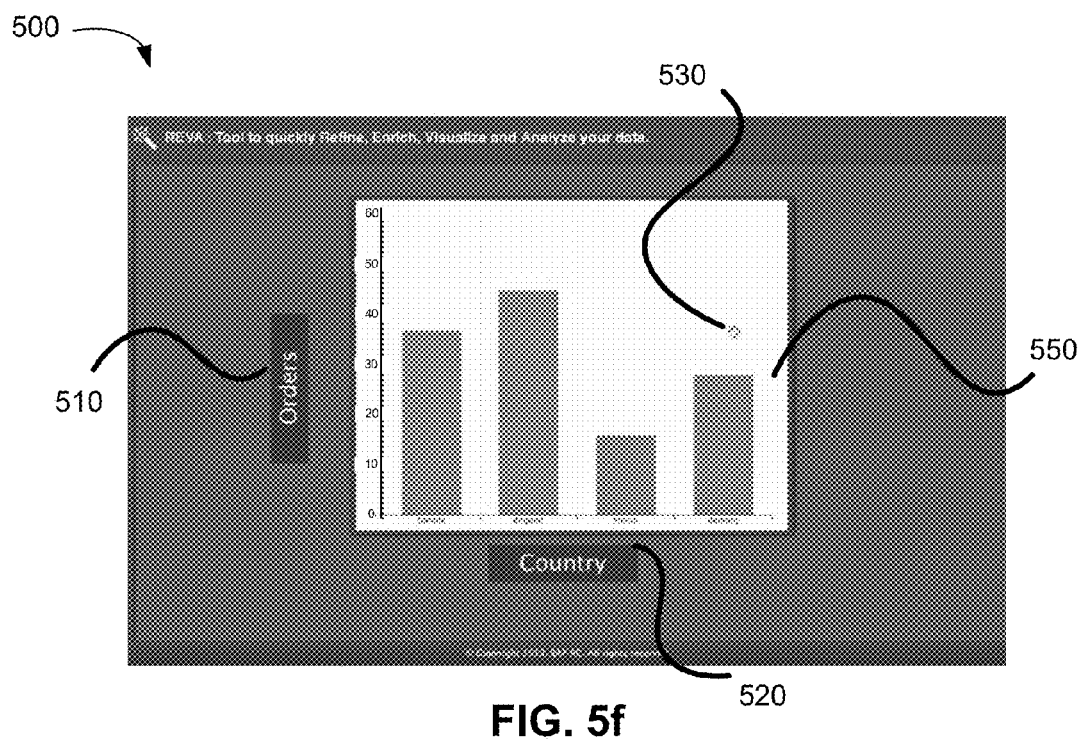

FIG. 5f illustrates a GUI presenting a dynamic chart according to one embodiment. GUI 500 presents dynamic chart 550 as shown in FIG. 5e. GUI 500 is configured to detect a swipe gesture performed on dynamic chart 550 to change the type of chart being presented. The swipe gesture can be initiated on or near an edge of dynamic chart 550 and move towards the middle of dynamic chart 550. This swipe gesture can reveal a hidden menu for changing the chart type. Here, gesture 530 can be detected initially near the right edge of dynamic chart 550 and can continue towards the middle of dynamic chart 550. In one example, gesture 530 can be detected from a finger touching a touch display or alternatively from a finger clicking and dragging a mouse.

Figure 5G:
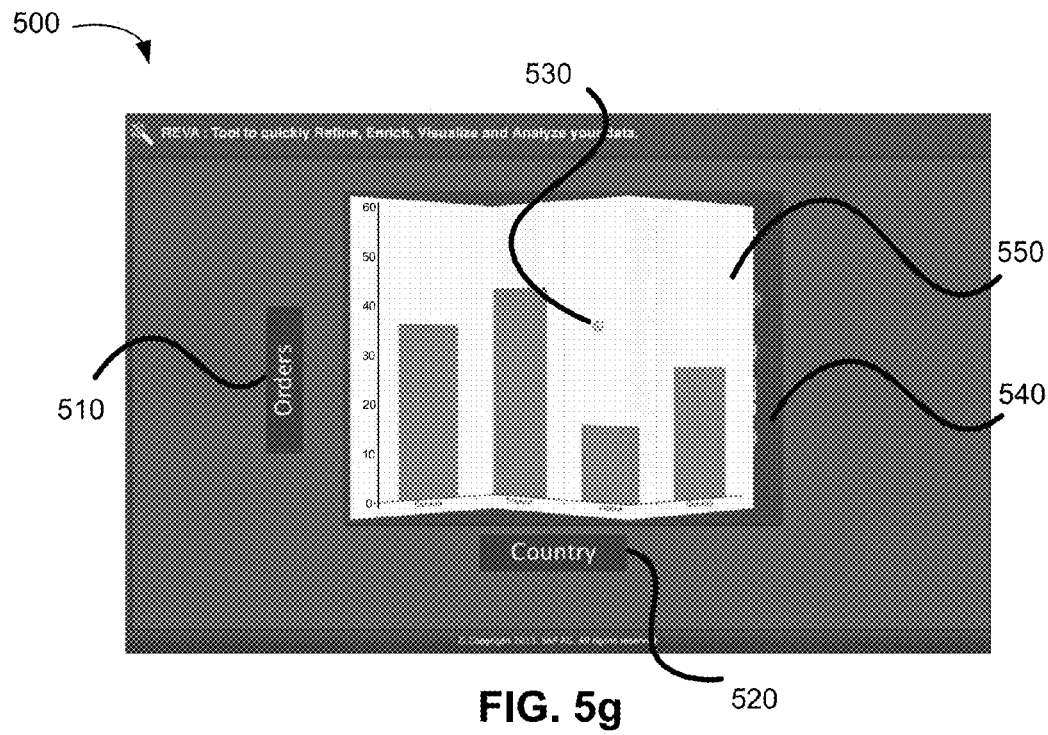

FIG. 5g illustrates a GUI presenting a dynamic chart according to one embodiment. As shown, gesture 530 includes a swipe or drag movement towards the middle of dynamic chart 550. The application can detect gesture 530 from GUI 500 and in response to gesture 530, animate dynamic chart 550 in a manner where the dynamic chart 550 appears as though it is being folded in the direction of the swipe gesture. In one example, the fold pattern of dynamic chart 550 can be on a predefined distance interval where each fold is equidistant from one another. In another example, the speed in which dynamic chart 550 is folded to reveal hidden menu 540 can be directly proportional to the speed of the swipe gesture of gesture 530. If the swipe gesture is fast, then dynamic chart 550 is folded fast. Alternatively if the swipe gesture is slow, then dynamic chart 550 is folded slowly. In one example, the Y-axis label 510 and x-axis label 520 can remain in the same position in GUI 500 as dynamic chart 550 is animated. Here, hidden menu 540 is presented as dynamic chart 550 is folded in the direction of the swipe gesture.

Figure 5H:
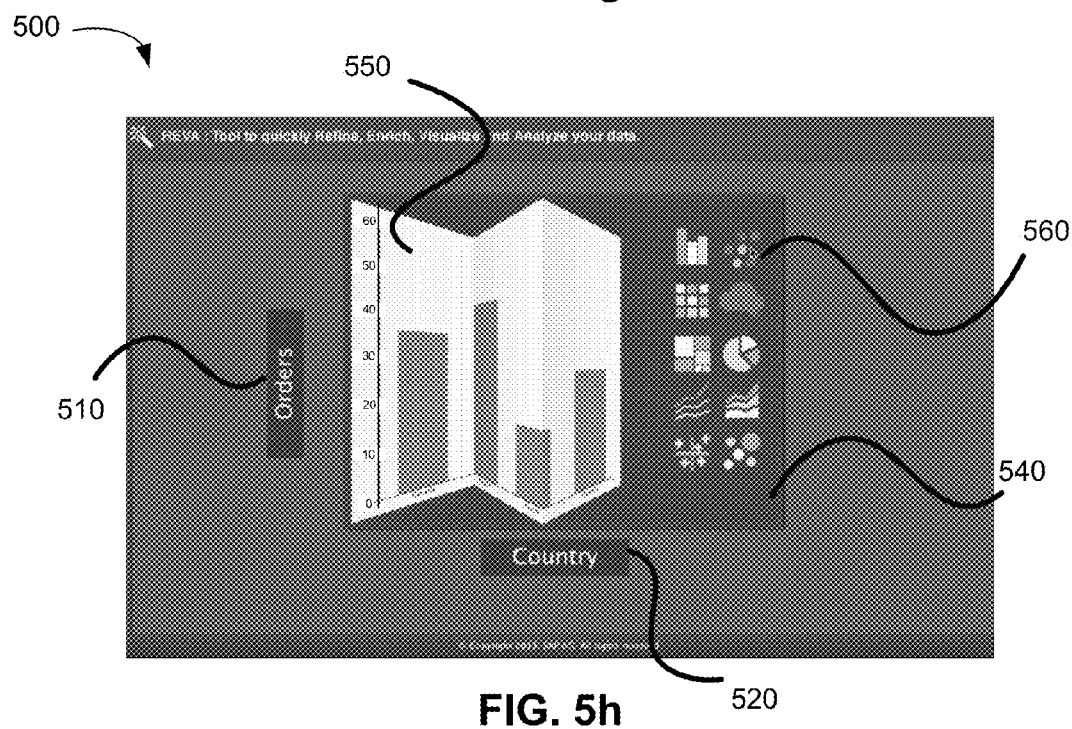

FIG. 5h illustrates a GUI presenting a dynamic chart according to one embodiment. As shown, dynamic table 550 has been folded away to reveal hidden menu 540. Hidden menu 540 can include a set of selectable chart types. When GUI 500 detects the selection of one of the chart types, the application can process and present dynamic chart 550 as a different chart type. Here, GUI 500 detects the selection of icon 560 which is associated with a scatterplot chart type. In response to the detection, the application can reprocess the information in dynamic chart 550 in order to display dynamic chart 550 in the chart type associated with icon 530. In one example, icon 560 can change appearance when selected. Y-axis label 510 and x-axis label 520 can remain in the same location on GUI 500 as dynamic chart 550 is being manipulated by the gestures. In other embodiments, different hidden menus can be presented depending on the edge of dynamic chart 550 which the touch gesture is on or near. For example, a gesture originating on or near the left edge can reveal another hidden menu that displays polarizing filters or color filters to change the appearance of dynamic chart 550. In yet other examples, tabs can be presented on GUI 500 that when selected, present options to change the appearance or apply effects to dynamic chart 550. In one embodiment, the icons presented in hidden menu 540 can be customized depending on the variables that are being presented in dynamic chart 550. Therefore, only chart types that are appropriate for the variables being presented in dynamic chart 550 are included in hidden menu 540. The other chart types can remain invisible in hidden menu 540. In one example, the variables can be either quantitative or dimensional. If dynamic chart 550 is presenting a dimensional variable and a quantitative variable, then other chart types that are based on a dimensional variable and a quantitative variable can be presented in hidden menu 540 as an option for changing the appearance of dynamic chart 550.

Figure 5I:
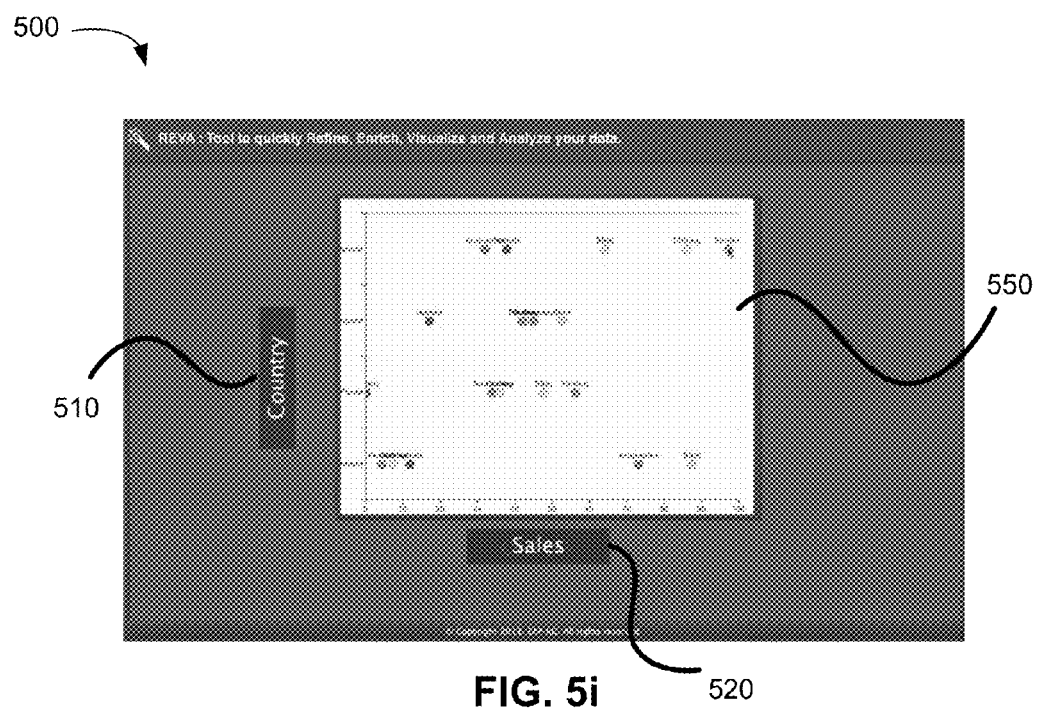

FIG. 5*i* illustrates a GUI presenting an updated dynamic chart according to one embodiment. Upon detecting the selection of a chart type from hidden menu 540, dynamic chart 550 can be updated to present the data associated with the variables selected by y-axis label 510 and x-axis label 520 in a chart according to the selected chart type. Here, the application has detected that a scatterplot chart was selected from the hidden menu and as a result, the application processes data in the underlying table to display the data as a scatterplot chart. The scales for the x-axis and y-axis can be updated to be compatible with the new chart type.

Method Embodiments

Figure 6:
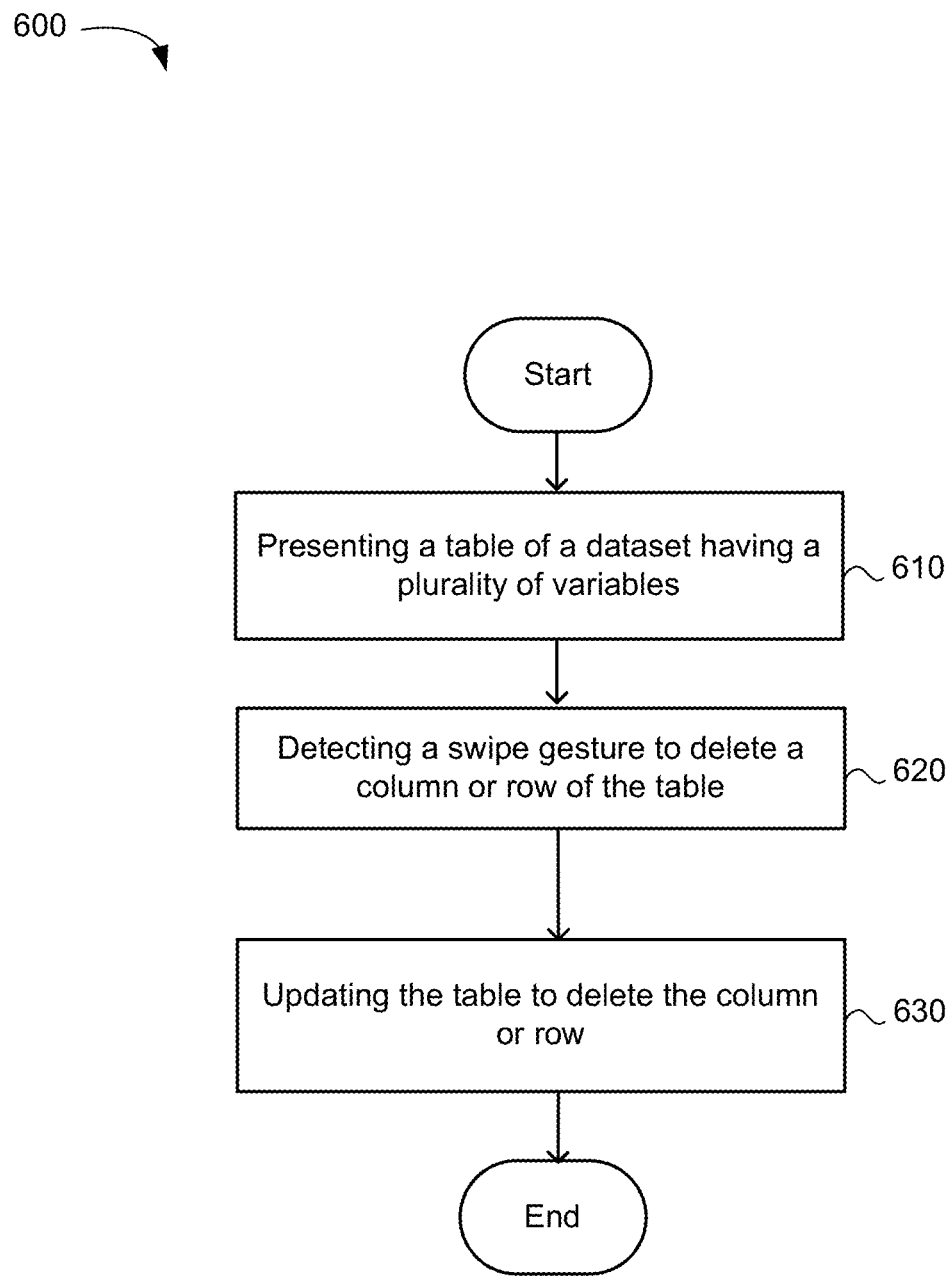
FIG. 6 illustrates a process to delete a column or row from a table according to one embodiment.

FIG. 6 illustrates a process to delete a column or row from a table according to one embodiment. Process 600 can be stored in computer readable code and executed by a computer. Process 600 begins by presenting a table of a dataset having a plurality of variables at 610. In one example, the table can present each record in a row and each variable in a column. Process 600 can then continue by detecting a swipe gesture to delete a column or row of the table at 620. The swipe gesture can be detected on a touch display or alternatively can be detected from a click and drag gesture performed on a mouse. The swipe gesture can be initiated on an area belonging to the desired column or row and cross a predefined number of entries in the column or row. Once the swipe gesture is detected on a column or row, the column or row has been selected. Process 600 can continue by updating the table to delete the selected column or row at 630.

Figure 7:
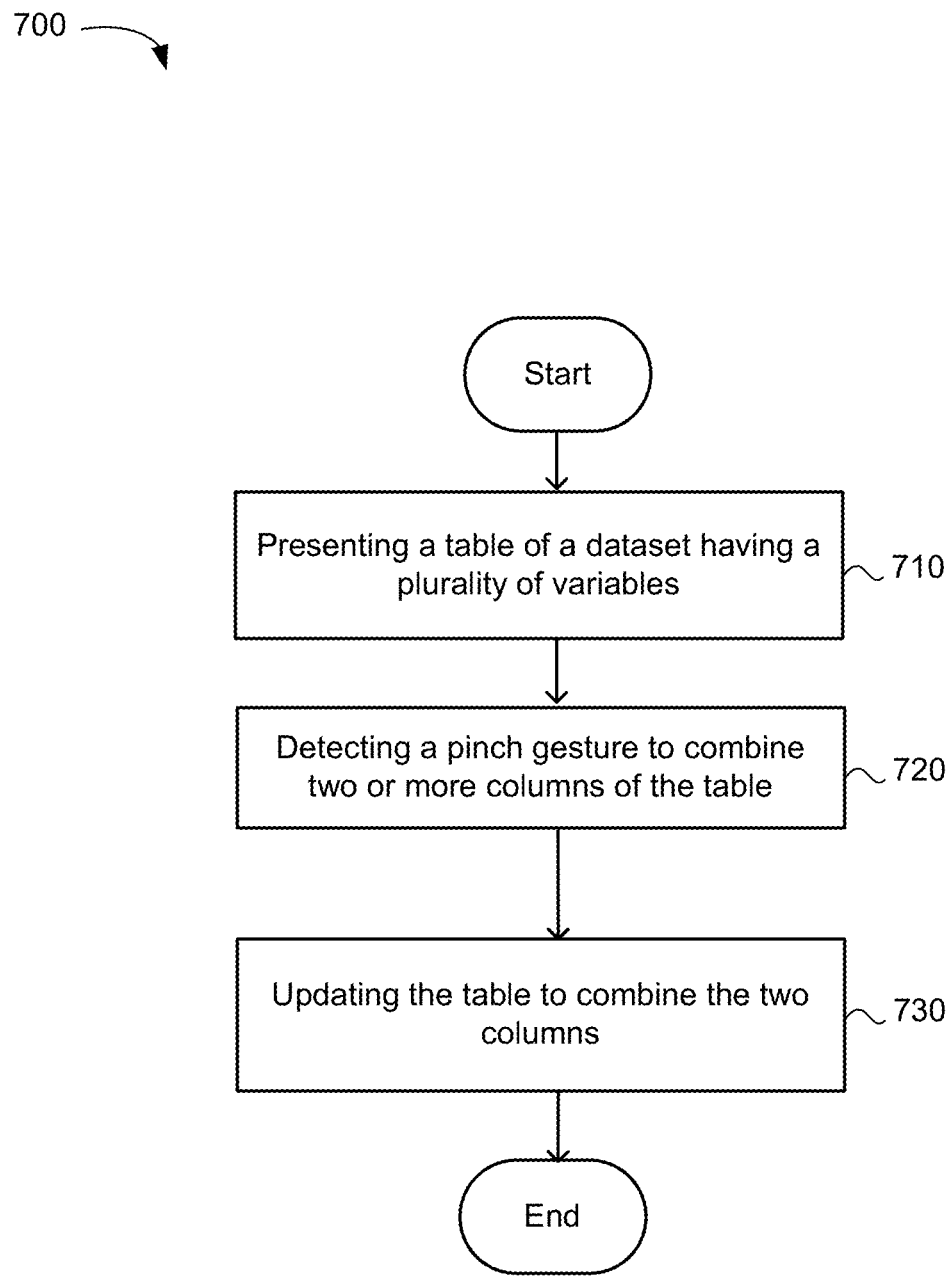
FIG. 7 illustrates a process to combine two or more columns in a table according to one embodiment.

FIG. 7 illustrates a process to combine two or more columns in a table according to one embodiment. Process 700 can be stored in computer readable code and executed by a computer. Process 700 begins by presenting a table of a dataset having a plurality of variables at 710. In one example, the table can present each record in a row and each variable in a column. Process 700 can then continue by detecting a pinch gesture to combine two or more columns of the table at 720. The pinch gesture can identify two or more columns in a table. Once the columns have been identified, process 700 can proceed by updating the table to combine the two or more columns at 730. When combining headers in the table, the headers can be appended to one another and be separated by a comma, a plus sign, or a space. When combining entries in the table, the entries can be appended to one another separated by a separator such as a comma or space. In other examples, entries in the table can be combined according to the entry type. For instance, combining two entries that are both numbers can result in adding the two numbers together while combining two entries that are words can result in appending a second word to the first word with a separator in between. In other embodiments, process 700 can also be applied to combine two or more rows in the table.

Figure 8:
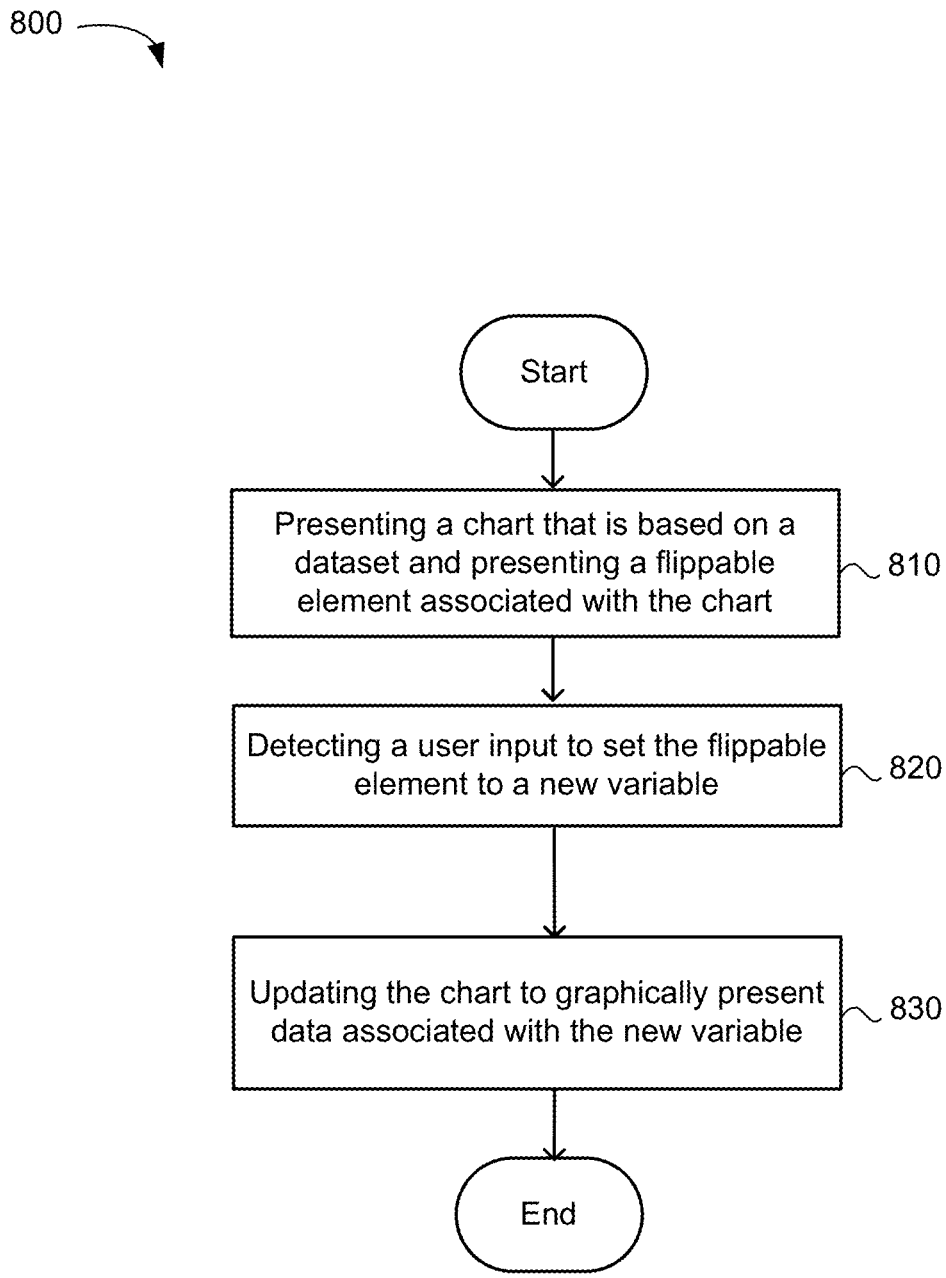
FIG. 8 illustrates a process to update the content in a chart according to one embodiment.
Figure 9:
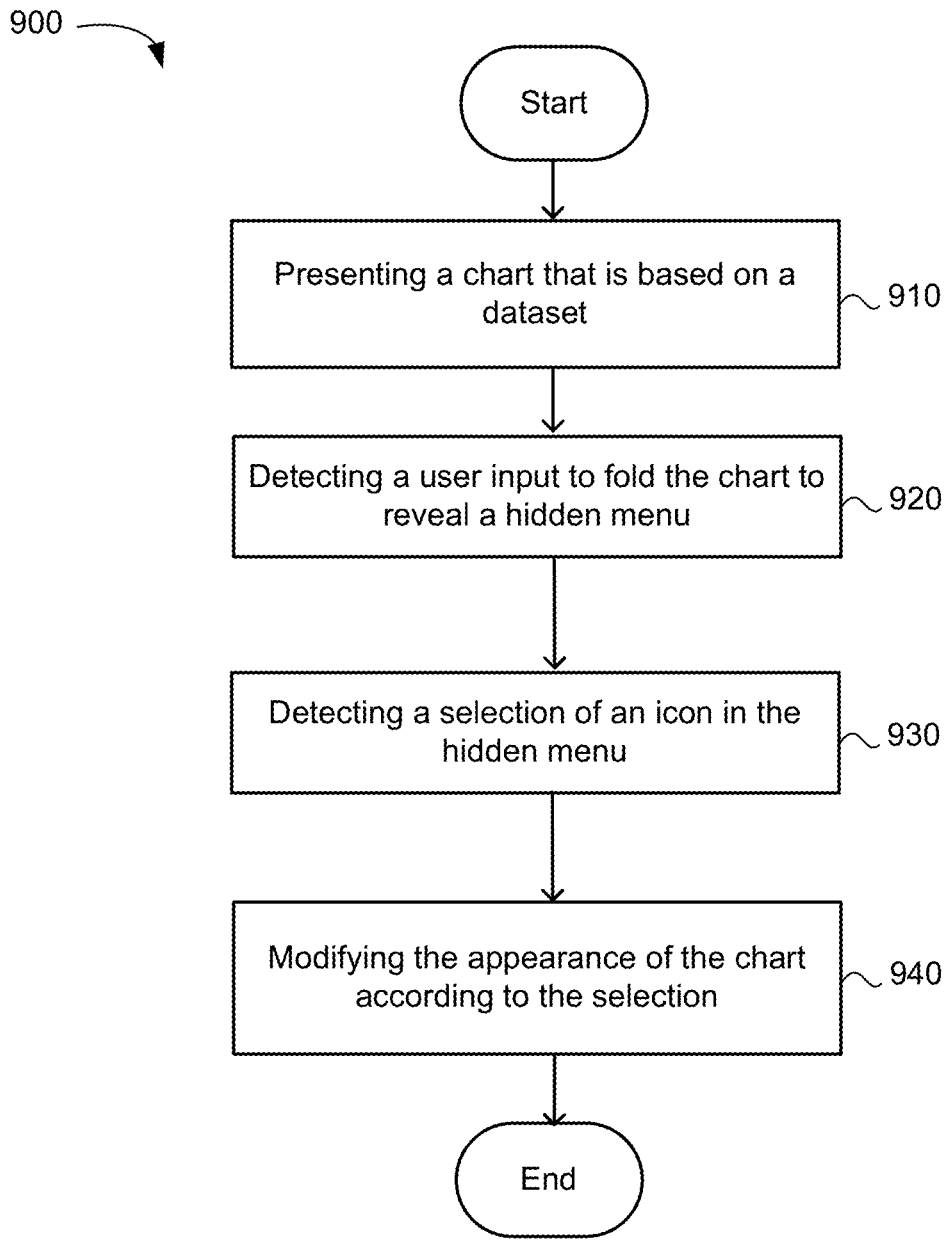
FIG. 9 illustrates a process for modifying the appearance of a chart according to one embodiment.

FIG. 8 illustrates a process to update the content in a chart according to one embodiment. Process 800 can be stored in computer readable code and executed by a computer. Process 800 begins by presenting a chart that is based on a dataset and presenting a flippable element associated with the chart at 810. The chart can present one or more variables from the dataset for comparison or analysis. In one example, the flippable element identifies a variable that is being presented on the chart. In another example, the flippable element can be used to identify an axis of the chart. After presenting the chart, process 800 continues by detecting a user input to set the flippable element to another variable at 820. In one example, the user input can be a touch and swipe feature performed on or near the flippable element. For instance, detecting a flick of a finger on a touch display can result in the application presenting an animation of the flippable element flipping through available variables in the dataset. The available variables can be variables that are not currently being presented in the chart. When it is detected that the finger is no longer touching the touch display, the variable currently being identified by the flippable element is considered to be selected as the new variable. The flippable element is said to be set the new variable. Once the new variable has been set, process 800 continues by updating the chart to graphically present data associated with the new variable at 830. Updating the chart can include replacing data in the chart that is associated with the original variable with data in dataset that is associated with the new variable. In some embodiments, the scale on the axis can also be updated to represent the new variable that is being presented in the chart. By allowing the content in a chart to be updated from touch gestures detected on flippable elements, the chart can be dynamically updated easily without requiring FIG. 9 illustrates a process for modifying the appearance of a chart according to one embodiment. Process 900 can be stored in computer readable code and executed by a computer. Process 900 begins by presenting a chart that is based on a dataset at 810. The chart can present one or more variables from the dataset for comparison or analysis. After presenting the chart, process 900 continues by detecting a user input to fold the chart to reveal a hidden menu at 920. In one example, the user input is a touch gesture on a touch display. The touch gesture can be a touch gesture on or near an edge of the chart continued with a swipe gesture towards the center of the chart. This can result in the chart folding in the direction of the swipe gesture. The space that was previously occupied by the chart can be utilized to present a hidden menu. In some examples, the rate in which the chart is folded away to reveal the hidden menu can be based on the rate of the swipe gesture. Process 900 can then continue by detecting a selection of an icon in the hidden menu at 930. The icon can be selected when a touch gesture is detected on the icon. Upon detecting the selection, process 900 continues by modifying the appearance of the chart according to the selection at 940. In one example, the hidden menu can present icons representing different chart types. When one of the icons is selected, the appearance of the chart can be modified to the selected chart type. For example, a bar chart can be modified into a pie chart when the pie chart icon is selected.

Figure 10:
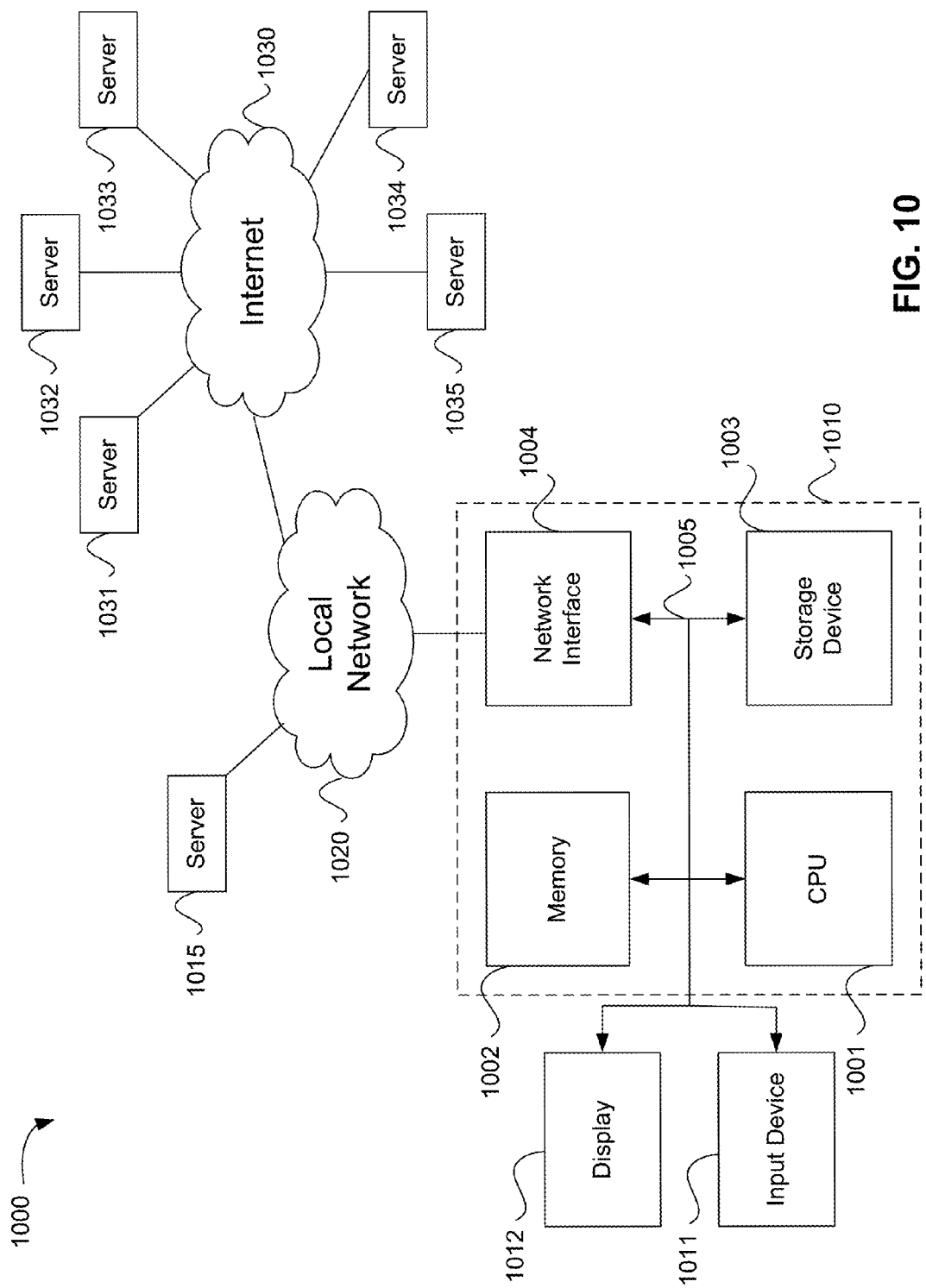
FIG. 10 illustrates an exemplary computer system according to one embodiment.

An exemplary computer system 1000 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 1010 can send and receive information, including messages or other interface actions, through the network interface 1004 across a local network 1020, an Intranet, or the Internet 1030. For a local network, computer system 1010 may communicate with a plurality of other computer machines, such as server 1015. Accordingly, computer system 1010 and server computer systems represented by server 1015 may form a cloud computing network, which may be programmed with processes described herein. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 1004 to a component on computer system 1010. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method for presenting a chart in a touch-sensitive display screen of a data processing device, comprising:

graphically presenting in the chart, by a processor, data associated with a first variable of a plurality of variables in a dataset;

graphically presenting a label located along an axis of the chart that display a first name associated with the first variable of the dataset and comprises a visual element capable of being rotated from a first state to at least a second state, wherein rotating the label cycles through the plurality of variables in the dataset;

detecting, by the processor, a first input comprising a single swipe gesture on or near the label on the display screen;

rotating the label in the display screen from the first state into the second state in response to the single swipe gesture;

graphically presenting a second name associated with a second variable of the dataset in the display screen in response to detecting the single swipe gesture, wherein the second name corresponds to the second state and is different than the first name; and updating, by the processor, the chart to graphically present data associated with the second variable rather than the first variable;

detecting, by the processor, a second input comprising a second single swipe gesture;

upon receiving the second input, presenting an animation that appears as though the chart is being folded in the direction of the second swipe gesture to reveal a hidden menu underneath the chart in the display screen, the hidden menu configured to modify the appearance of the chart;

detecting, by the processor, a selection from the hidden menu; and modifying, by the processor, the appearance of the chart according to the selection.

2. The computer-implemented method of claim 1, wherein the label is rotated at a speed of rotation proportional to the speed of the single swipe gesture.

3. The computer-implemented method of claim 1, wherein the second input is a swipe gesture towards a center of the chart, the swipe gesture being initiated on or near a predefined edge of the chart.

4. A non-transitory computer readable storage medium storing one or more programs, the one or more programs comprising instructions for presenting a chart in a touch-sensitive display screen of a data processing device:

graphically presenting in the chart data associated with a first variable of a plurality of variables in a dataset;

graphically presenting a label located along an axis of the chart that displays a first name associated with the first variable of the dataset and comprises a visual element capable of being rotated from a first state to at least a second state, wherein rotating the label cycles through the plurality of variables in the dataset;

detecting a first input comprising a single swipe gesture on or near the label on the display screen;

rotating the label in the display screen from the first state into the second state in response to the single swipe gesture;

graphically presenting a second name associated with a second variable of the dataset in the display screen in response to detecting the single swipe gesture, wherein the second name corresponds to the second state and is different than the first name; and updating, by the processor, the chart to graphically present data associated with the second variable rather than the first variable;

detecting a second input comprising a second single swipe gesture;

upon receiving the second input, presenting an animation that appears as though the chart is being folded in the direction of the second swipe gesture to reveal a hidden menu underneath the chart in the display screen, the hidden menu configured to modify the appearance of the chart;

detecting a selection from the hidden menu; and modifying the appearance of the chart according to the selection.

5. The non-transitory computer readable storage medium of claim 4, wherein the updated chart replaces data associated with the first variable with data associated with the second variable.

6. The non-transitory computer readable storage medium of claim 4, wherein the label is rotated at a speed of rotation proportional to the speed of the single swipe gesture.

7. The non-transitory computer readable storage medium of claim 4, wherein the single swipe gesture is initiated on or near the visual element.

8. The non-transitory computer readable storage medium of claim 4, wherein the second input is a swipe gesture towards a center of the chart, the swipe gesture being initiated on or near a predefined edge of the chart.

9. A computer implemented system for presenting a chart in a touch-sensitive display screen of a data processing device, comprising:

one or more computer processors; and a non-transitory computer readable medium comprising instructions, that when executed, control the one or more computer processors to be configured for:

graphically presenting in the chart data associated with a first variable of a plurality of variables in a dataset;

graphically presenting a label located along an axis of the chart that display a first name associated with the first variable of the dataset and comprises a visual element capable of being rotated from a first state to at least a second state, wherein rotating the label cycles through the plurality of variables in the dataset;

detecting a first input comprising a single swipe gesture on or near the label on the display screen;

rotating the label in the display screen from the first state into the second state in response to the single swipe gesture;

graphically presenting a second name associated with a second variable of the dataset in the display screen in response to detecting the single swipe gesture, wherein the second name corresponds to the second state and is different than the first name; and updating, by the processor, the chart to graphically present data associated with the second variable rather than the first variable;

detecting a second input comprising a second single swipe gesture;

upon receiving the second input, presenting, an animation that appears as though the chart is being folded in the direction of the second swipe gesture to reveal a hidden menu underneath the chart in the display screen, the hidden menu configured to modify the appearance of the chart;

detecting a selection from the hidden menu; and modifying the appearance of the chart according to the selection.

10. The computer implemented system of claim 9, wherein the updated chart replaces data associated with the first variable with data associated with the second variable.

11. The computer implemented system of claim 9, wherein the label is rotated at a speed of rotation proportional to the speed of the single swipe gesture.

12. The computer implemented system of claim 9, wherein the single swipe gesture is initiated on or near the visual element.

13. The computer implemented system of claim 9, wherein the second input is a swipe gesture towards a center of the chart, the swipe gesture being initiated on or near a predefined edge of the chart.

* * * * *